United States Patent
Segura et al.

(10) Patent No.: US 10,783,105 B2
(45) Date of Patent: Sep. 22, 2020

(54) COMMUNICATION NETWORK, ASSOCIATED MEASURING SYSTEM, TRANSPORTATION MEANS AND METHOD FOR BUILDING A COMMUNICATION NETWORK

(71) Applicant: THALES, Courbevoie (FR)

(72) Inventors: Eric Segura, Elancourt (FR); Jean-Jacques Julié, Elancourt (FR)

(73) Assignee: THALES, Courbevoie (FR)

( * ) Notice: Subject to any disclaimer, the term of this patent is extended or adjusted under 35 U.S.C. 154(b) by 108 days.

(21) Appl. No.: 16/115,813

(22) Filed: Aug. 29, 2018

(65) Prior Publication Data
US 2019/0079889 A1    Mar. 14, 2019

(30) Foreign Application Priority Data
Sep. 11, 2017    (FR) ...................................... 17 00911

(51) Int. Cl.
*G06F 13/40*    (2006.01)
*H04L 12/935*    (2013.01)
(Continued)

(52) U.S. Cl.
CPC ........ *G06F 13/4022* (2013.01); *H04L 49/101* (2013.01); *H04L 49/30* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 4,491,838 A | * | 1/1985 | West | G06F 15/17343 340/2.25 |
| 4,811,333 A | * | 3/1989 | Rees | H04Q 11/04 370/217 |

(Continued)

FOREIGN PATENT DOCUMENTS

JP    02206939 A  *  8/1990

OTHER PUBLICATIONS

Buckley; "New Monitoring Paradigms for Modern Avionics Buses"; Internaional Telemetering Congress, 2013; XP55482798.
(Continued)

*Primary Examiner* — Steven G Snyder
(74) *Attorney, Agent, or Firm* — Nixon & Vanderhye

(57) ABSTRACT

This communication network (18) extends between a plurality of input blocks ($E_1, \ldots, E_{N1}$) comprising a predetermined number P1 of input ports and a plurality of output blocks ($S_1, \ldots, S_{N2}$) comprising at least the same number P2 of output ports as the predetermined number P1. In this network, when the result of the multiplication of the number of input ports P1 by the number of input blocks N1 is even, the number N3 of switches is equal to:

$$N3 = N1 \times \frac{P1}{2},$$

and when the result of said multiplication is odd, the number N3 of switches is equal to:

$$N3 = \frac{N1 \times P1 - 1}{2},$$

(Continued)

and, for each switch, the first (30) and second (32) input terminals are each connected to different input blocks ($E_1, \ldots, E_{N1}$) and the first (34) and second (36) output terminals are each connected to different output blocks ($S_1, \ldots, S_{N2}$).

11 Claims, 6 Drawing Sheets

(51) Int. Cl.
*H04L 29/08* (2006.01)
*H04L 12/933* (2013.01)

(56) References Cited

U.S. PATENT DOCUMENTS

| | | | | |
|---|---|---|---|---|
| 5,303,383 | A * | 4/1994 | Neches | G01J 3/06 370/351 |
| 5,321,813 | A * | 6/1994 | McMillen | G01J 3/06 370/244 |
| 5,522,046 | A * | 5/1996 | McMillen | G01J 3/06 370/217 |
| 5,852,407 | A * | 12/1998 | Ishii | G06F 15/17393 340/2.21 |
| 5,872,904 | A * | 2/1999 | McMillen | G01J 3/06 370/217 |
| 6,105,122 | A * | 8/2000 | Muller | G06F 15/17 345/472 |
| 6,243,361 | B1 * | 6/2001 | McMillen | G01J 3/06 370/254 |
| 6,247,077 | B1 * | 6/2001 | Muller | G06F 15/17375 710/74 |
| 6,870,831 | B2 * | 3/2005 | Hughes | H04Q 11/06 370/352 |
| 7,058,084 | B2 * | 6/2006 | McMillen | G01J 3/06 370/464 |
| 7,706,361 | B2 * | 4/2010 | McMillen | G01J 3/06 370/386 |
| 8,139,479 | B1 * | 3/2012 | Raszuk | H04L 43/0811 370/217 |
| 8,750,319 | B2 * | 6/2014 | Yousefi | B60R 16/023 370/401 |
| 8,984,177 | B2 * | 3/2015 | Einig | G06F 11/2025 710/16 |
| 10,666,577 | B2 * | 5/2020 | Segura | H04L 49/101 |
| 2002/0010735 | A1 * | 1/2002 | McMillen | G01J 3/06 709/201 |
| 2003/0118013 | A1 * | 6/2003 | Steele | H04L 49/254 370/388 |
| 2006/0013207 | A1 * | 1/2006 | McMillen | G01J 3/06 370/388 |
| 2006/0245422 | A1 * | 11/2006 | Willhite | H04L 12/5601 370/359 |
| 2008/0317015 | A1 * | 12/2008 | Beshai | H04Q 11/06 370/380 |
| 2009/0290499 | A1 * | 11/2009 | Patel | H04L 47/6225 370/244 |
| 2011/0154108 | A1 * | 6/2011 | Candia | H04L 49/201 714/25 |
| 2015/0172098 | A1 * | 6/2015 | Agarwal | H04L 45/245 370/217 |
| 2016/0294616 | A1 * | 10/2016 | Cantaloube | H04L 41/0806 |
| 2017/0222831 | A1 * | 8/2017 | Zirkler | H04L 12/433 |

OTHER PUBLICATIONS

Gery; "A Flexible Switching Architechture for Diverse Signal Types"; International Telemetering Congress; 2007; XP55483284.
FR Search Report, dated Jun. 13, 2018, from corresponding FR application No. 1700911.

* cited by examiner

COMMUNICATION NETWORK, ASSOCIATED MEASURING SYSTEM, TRANSPORTATION MEANS AND METHOD FOR BUILDING A COMMUNICATION NETWORK

FIELD OF THE INVENTION

The present invention relates to a communication network of the type extending between a plurality of input blocks and a plurality of output blocks, each input block comprising a predetermined number P1 of input ports and each output block comprising at least the same number P2 of output ports as the predetermined number P1 of input ports, the predetermined number P1 of input ports being strictly greater than 1, the network comprising a plurality of switches, each switch comprising a first and a second input terminals and a first and a second output terminals and being capable of connecting the first and second input terminals, respectively, the first and second output terminals, or vice versa, based on a respective command signal received by the switch.

The present invention also relates to a measuring system, in particular for a transportation means, generically called carriers, for example able to be an aircraft, comprising such a communication network.

BACKGROUND OF THE INVENTION

The present invention also relates to a transportation means, generically called carrier, such as an aircraft, comprising such a measuring system and a method for building such a communication network.

In the field of communication networks and in particular communication networks for carriers or means of transportation, it is known to use communication networks connecting input blocks, for example with measuring sensors, to output blocks, for example corresponding to computers capable of processing measured data transmitted by the measuring sensors. Such measured data is for example data relative to the environment of the carrier, and in particular to the electromagnetic environment of the carrier. The present invention is particularly applicable to the transmission of so-called raw digital signals from measuring sensors. The digital signals for example comprise data samples measured by sensors of the Radar type or from electromagnetic listening or raw data streams.

Such communication networks are relatively complex in order in particular to guarantee a certain resistance to failures or downtime of certain output blocks and a possibility of adaptation to an evolution of the throughput leaving the input blocks in particular in case of evolution of the performance of the sensors. These communication networks, however, make it possible to provide the routing of data between the input blocks and the output blocks securely.

It is in particular known to use communication networks comprising so-called systematic routing matrices, capable of routing any data stream measured by a measuring sensor toward any computer. Such routing matrices comprise several stages of switches connected to one another, with each switch, also called crossbar, comprising first and second input terminals and first and second output terminals. Each switch is able to connect the first and second input terminals, respectively, to first and second output terminals or vice versa, based on a command signal received by the switch.

In such communication networks, in order to adapt them to an evolution of the throughput leaving the measuring sensors, it is known to duplicate the routing matrix and to connect, in parallel, a plurality of routing matrices to the measuring sensors and the computers.

However, such communication networks have a complex architecture, in particular leading to significant energy losses through the communication network, and provide limited resistance to failures, in particular of the switches.

SUMMARY OF THE INVENTION

The invention aims to resolve these drawbacks by proposing a communication network having a simplified architecture, limiting the impact of downtime of a switch on the operation of the network and remaining robust with respect to failures or downtime of the output blocks and an evolution of the throughput of the input blocks.

To that end, the invention relates to a communication network of the aforementioned type, wherein:
when the result of the multiplication of the number of input ports P1 by the number of input blocks N1 is even, the number N3 of switches is equal to:

$$N3 = N1 \times \frac{P1}{2},$$

with N1 the number of input blocks, and
when the result of the multiplication of the number of input ports P1 by the number of input blocks N1 is odd, the number N3 of switches is equal to:

$$N3 = \frac{N1 \times P1 - 1}{2},$$

and one of the input ports of one of the input blocks is connected directly via a data link to the output port of one of the output blocks, and wherein for each switch, the first and second input terminals are each connected directly via a respective data link to different input blocks and the first and second output terminals are each connected directly via a respective data link to different output blocks.

Owing to the invention, the number of switches of the communication network is minimized and a single stage of switches is used between the input blocks and the output blocks. Thus, the architecture of the network is simplified, and the impact of downtime of a switch on the operation of the network is limited, since there are no switches whose downtime would cause a communication downtime with an input block or an output block.

Furthermore, the manner in which the switches are connected to the various input and output blocks makes it possible to guarantee that the communication network remains robust with respect to failures or downtime of the output blocks and to an evolution in throughput of the data stream transmitted by the input blocks.

According to specific embodiments, the invention has one or more of the following features, considered alone or according to any technically acceptable combination(s):
for each switch, the first and second input terminals are connected to the input blocks via one of their input ports and the first and second output terminals are connected to the output blocks via one of their output ports, and wherein each input port is respectively connected to a single one of the data links and each output port is respectively connected to a single one of the data links;

the data links are point-to-point physical links;

by numbering the input blocks with a different index j going from 1 to N1 and the output blocks with a different index i going from 1 to N2, with N2 the number of output blocks, and the switches with a different index m going from 1 to N3, the total number of switches, the communication network respects the following rules in order to connect the input blocks, the output blocks and the switches to one another via the data links:

a first set of P1 switches is selected from among the switches according to a numbering order of the switches, a second set of P1 output blocks is selected from among the output blocks according to a numbering order of the output blocks, the input ports of the input block having an index j equal to 1 are respectively connected to one of the input terminals of a respective switch of the first set, one of the output terminals of each switch of the first set is connected to one of the output ports of a respective output block of the second set, for each input block with index j going from 2 to N1 considered successively:

a third set of P1 switches having at least one free input terminal is selected, traveling over all of the switches one by one following their numbering order starting from the switch having an index m corresponding to the index j of the input block, the input ports of the input block are respectively connected to one of the input terminals of a respective switch of the third set, and if the number of switches of the third set is below the number of input ports of the input block, one of the free input ports of the input block is connected to a free output port of one of the output blocks, for each switch in the third set, considered successively in the numbering order of the switches starting from the switch having an index m corresponding to the index j of the input block:

if the switch has a single output block already connected to one of the output blocks, the other output terminal of the switch is connected to a following output block, relative to the numbering order of the output blocks, if the switch is connected to none of the output blocks, one of the output terminals of the switch is connected to one of the output ports of the output block that has just been connected to a switch belonging to the third set when said output block that has just been connected to a switch belonging to the third set has at least one free output port, otherwise one of the output terminals of said switch is connected to one of the output ports of the following output block, relative to the numbering order of the output blocks, that which has just been connected to a switch belonging to the third set;

the communication network comprises a device for detecting downtime of the output blocks and/or switches and a command device able to send each command signal to each switch, and wherein the command device comprises a computing unit configured to compute each command signal as a function of the detected downtime.

The invention also relates to a measuring system in particular for a carrier, such as an aircraft, comprising a plurality of input blocks, such as measuring sensors, a plurality of output blocks, such as computing members, and a communication network extending between the input blocks and the output blocks, wherein the communication network is as defined above.

Advantageously, each input block is able to send, on each input port, an input data stream having a predetermined input throughput and each output block is able to receive an output data stream having a maximal output throughput, and for each output block, the associated maximum output throughput verifies the inequality $Q_i \geq A \times q_M + R$, with i an index representative of the output block in question, with $q_M$ a maximum of the predetermined input throughputs, A an integer strictly greater than 1 and R a real number strictly less than $q_M$.

Also advantageously, the predetermined number P1 of input ports verifies the following inequality: P1 s A.

The invention further relates to a carrier, in particular an aircraft, that comprises a measuring system as defined above.

The invention also relates to a method for building a communication network extending between a plurality of input blocks and a plurality of output blocks, each input block comprising a predetermined number P1 of input ports and each output block comprising at least the same number P2 of output ports as the predetermined number P1 of input ports, the predetermined number P1 of input ports being strictly greater than 1, the method comprising the following step:

providing a plurality of switches, each switch comprising a first and second input terminal and a first and second output terminal and being able to connect the first and second input terminals, respectively, to first and second output terminals or vice versa, based on a command signal received by the switch, wherein:

if the result of the multiplication of the number of input ports by the number of input blocks is even, the number N3 of switches provided during the provision step is equal to:

$$N3 = N1 \times \frac{P1}{2},$$

with N1 the number of input blocks, and if the result of the multiplication of the number of input ports by the number of input blocks is odd, the number N3 of switches provided during the provision step is equal to:

$$N3 = \frac{N1 \times P1 - 1}{2},$$

when the result of the multiplication of the number P1 of input ports by the number N1 of input blocks is odd, the method comprises a linking step during which one of the input ports of one of the input blocks is connected directly via a data link to the output port of one of the output blocks, and wherein the method further comprises, for each switch, the following steps:

the direct connection of the first and second input terminals via a respective data link to different input blocks, and the direct connection of the first and second output terminals via a respective data link to different output blocks.

Advantageously, by numbering the input blocks with a different index j going from 1 to N1 and the output blocks with a different index i going from 1 to N2, with N2 the number of output blocks, and the switches with a different index m going from 1 to N3, the total number of switches, the method comprises, during the linking and connection steps, the following sub-steps, in order to connect the input blocks, the output blocks and the switches to one another via the data links:

a first set of P1 switches is selected from among the switches according to a numbering order of the switches, a second set of P1 output blocks is selected from among the output blocks according to a numbering order of the output blocks, the input ports of the input block having an index j equal to 1 are respectively connected to one of the input terminals of a respective switch of the first set, one of the output terminals of each switch of the first set is connected to one of the output ports of a respective output block of the second set, for each input block with index j going from 2 to N1 considered successively:

a third set of P1 switches having at least one free input terminal is selected, traveling over all of the switches one by one following their numbering order starting from the switch having an index m corresponding to the index j of the input block, the input ports of the input block are respectively connected to one of the input terminals of a respective switch of the third set, and if the number of switches of the third set is below the number of input ports of the input block, one of the free input ports of the input block is connected to a free output port of one of the output blocks, for each switch in the third set, considered successively in the numbering order of the switches starting from the switch having an index m corresponding to the index j of the input block:

if the switch has a single output block already connected to one of the output blocks, the other output terminal of the switch is connected to a following output block, relative to the numbering order of the output blocks, if the switch is connected to none of the output blocks, one of the output terminals of the switch is connected to one of the output ports of the output block that has just been connected to a switch belonging to the third set when said output block that has just been connected to a switch belonging to the third set has at least one free output port, otherwise one of the output terminals of said switch is connected to one of the output ports of the following output block, relative to the numbering order of the output blocks, that which has just been connected to a switch belonging to the third set.

BRIEF DESCRIPTION OF THE DRAWINGS

The invention will be better understood using the following description, provided solely as a non-limiting example and done in reference to the appended drawings, in which.

DETAILED DESCRIPTION OF THE INVENTION

The transportation means 10, also called carrier, shown in FIG. 1 corresponds to an aircraft in FIG. 1 and is called aircraft or carrier hereinafter.

Alternatively, the carrier 10 is a vehicle other than an aircraft, such as a land, sea or underwater vehicle and in particular a train, car or boat.

Figure 2:
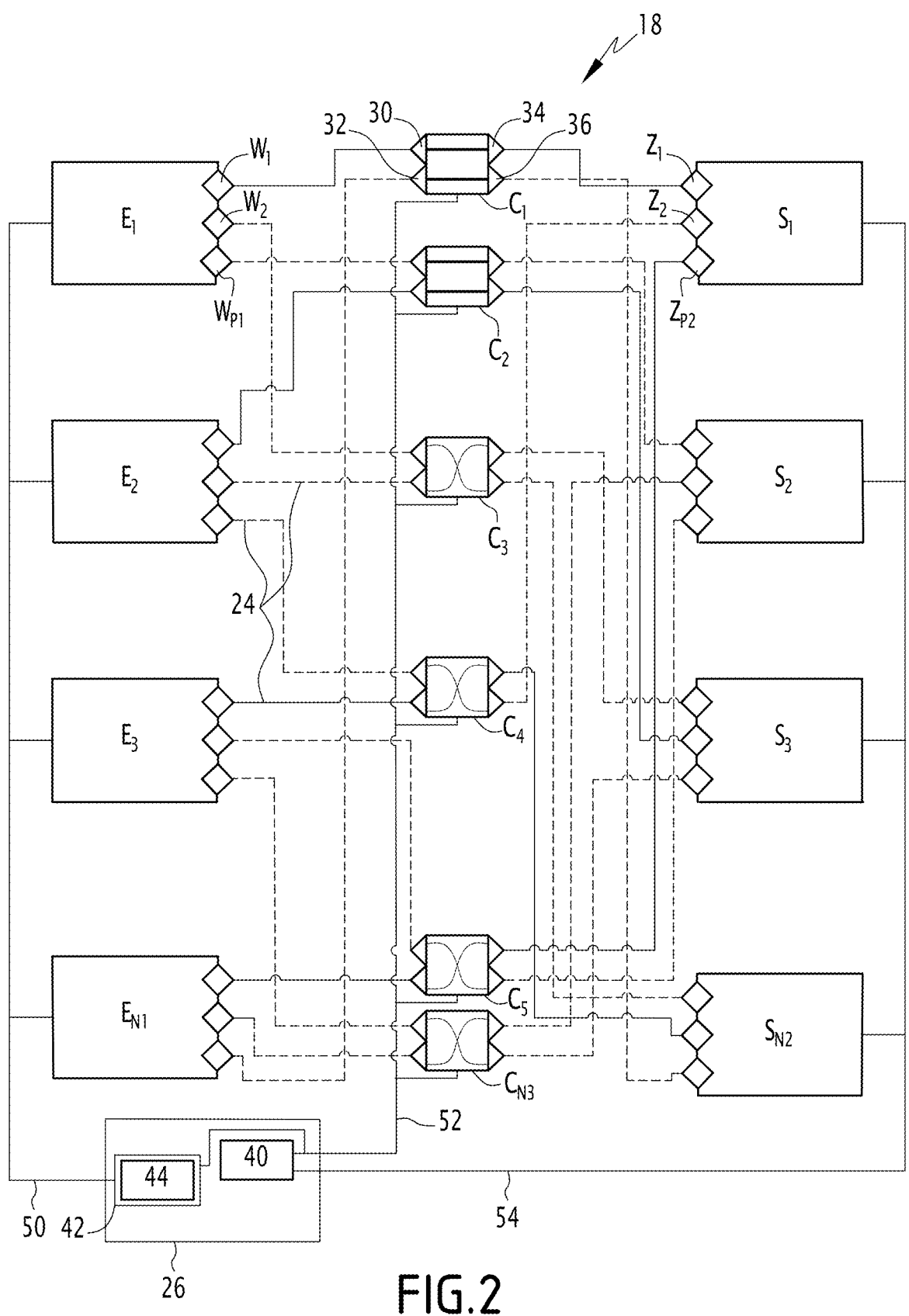
FIG. 2 is a schematic illustration of a configuration of the communication network of FIG. 1 in a first operating mode of the measuring system.
Figure 3:
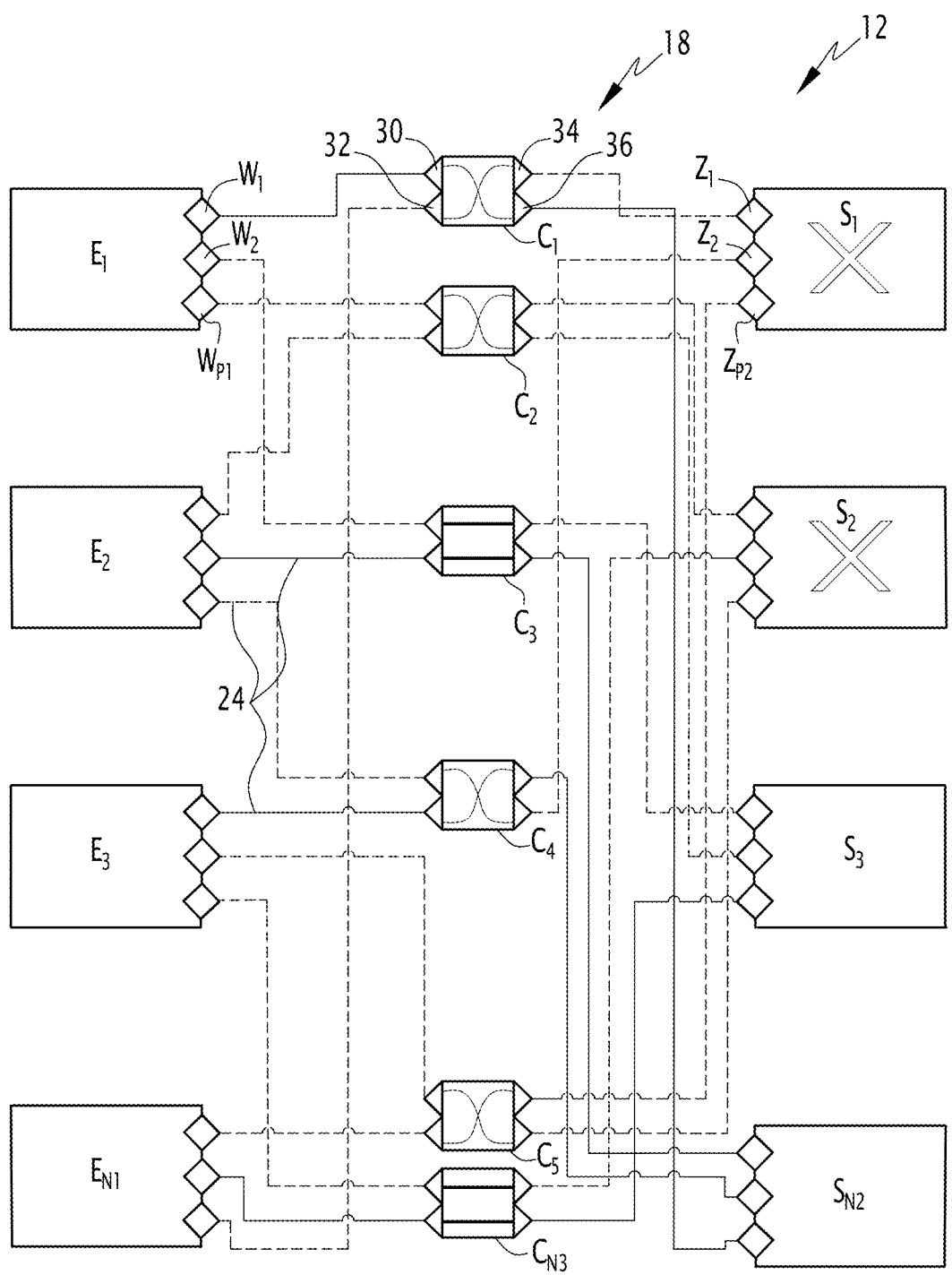
FIG. 3 is a simplified schematic illustration of the configuration of the communication network of FIG. 1, in a second operating mode of the measuring system.
Figure 4:
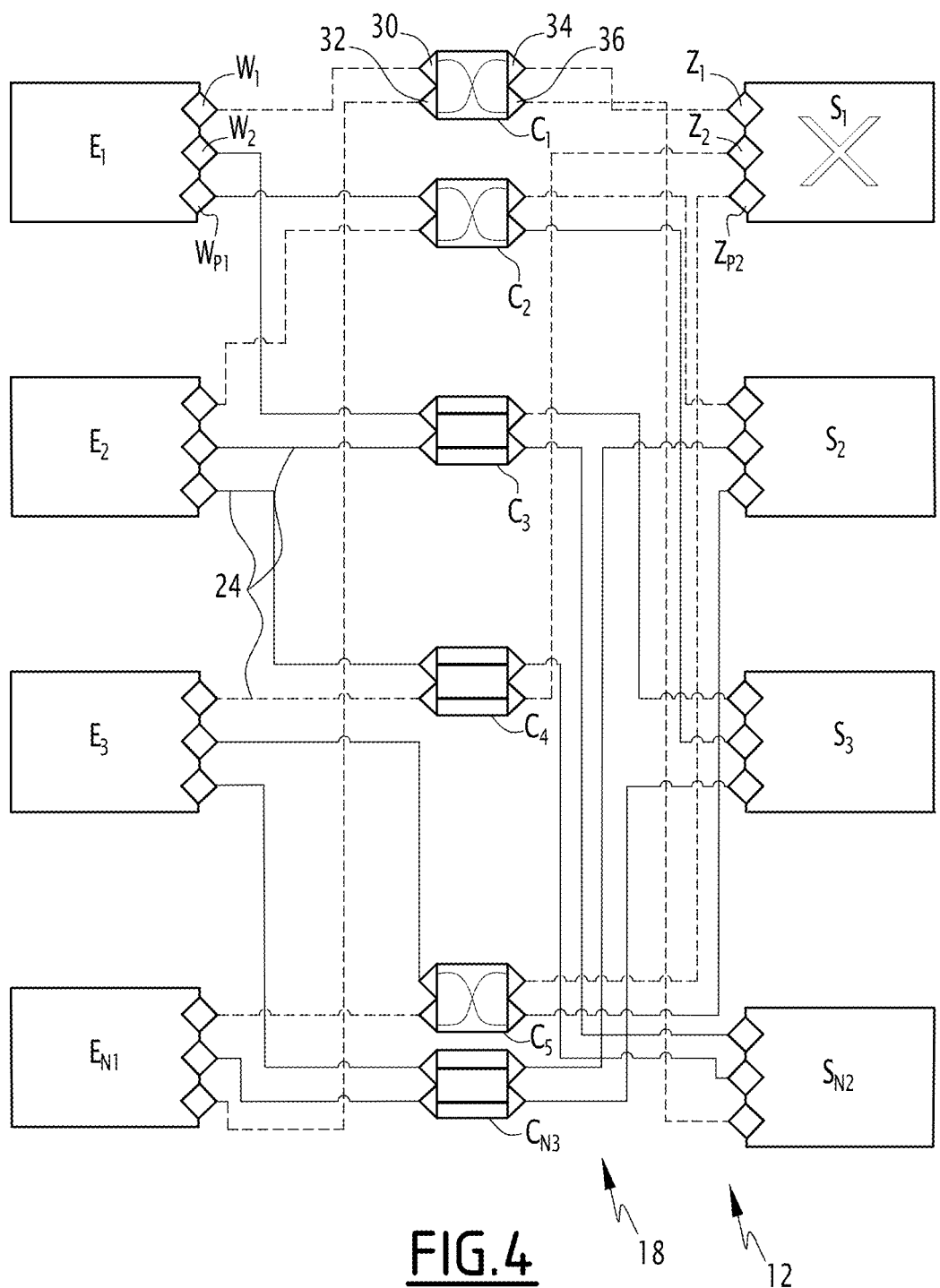
FIG. 4 is a simplified schematic illustration of the configuration of the communication network of FIG. 1, in a third operating mode of the measuring system.

The carrier 10 comprises a measuring system 12 shown in more detail in FIGS. 2 to 4, capable of determining parameters relative to the environment in which the carrier travels, i.e., the aircraft in our example.

Figure 1:
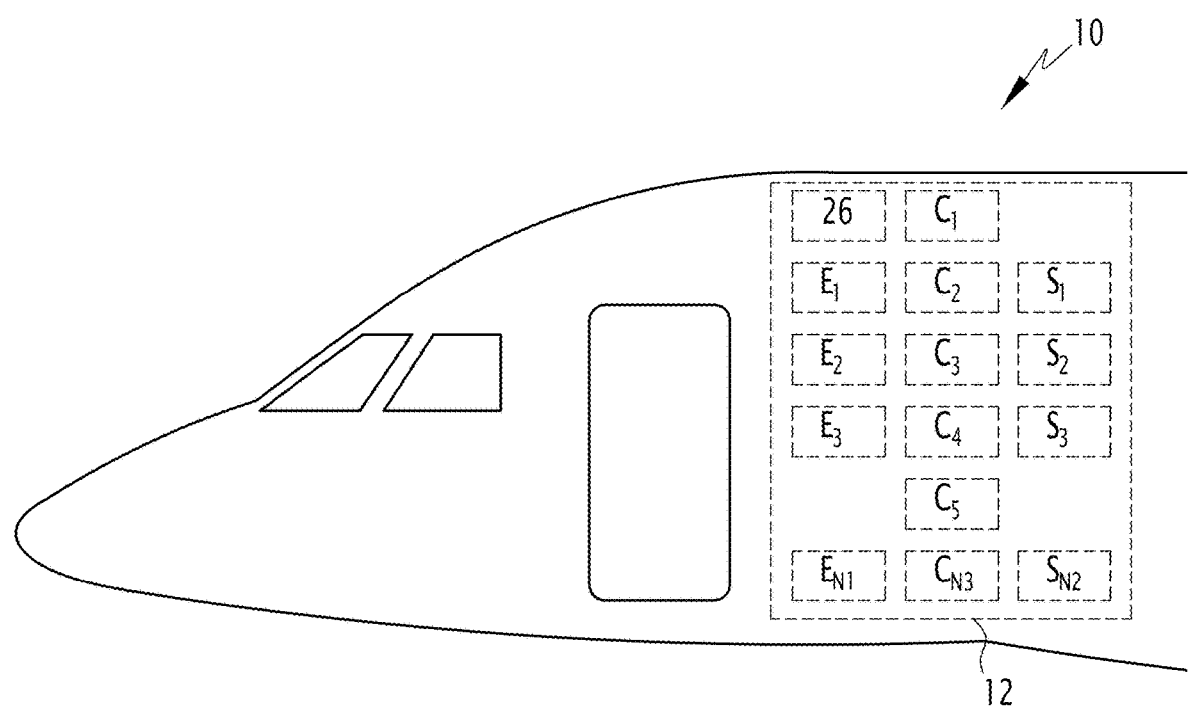
FIG. 1 is a partial schematic illustration of a transportation means or carrier, in particular an aircraft, comprising a measuring system including a first example of a communication network according to the invention.

In the example of FIG. 1, the aircraft is for example an airplane.

The parameters relative to the environment of the carrier, i.e., the aircraft, are in particular parameters relative to the electromagnetic environment of the carrier. The parameters relative to the environment of the carrier are for example parameters indicating the detection, location and identification of objects around the carrier.

The measuring system 12 comprises a plurality of input blocks $E_1, \ldots, E_{N1}$, a plurality of output blocks $S_1, \ldots, S_{N2}$ and a communication network 18 extending between the input blocks $E_1, \ldots, E_{N1}$ and the output blocks $S_1, \ldots, S_{N2}$.

More specifically, the measuring system 12 comprises a number N1 of input blocks $E_1, \ldots, E_{N1}$, and a number N2 of output blocks $S_1, \ldots, S_{N2}$.

Advantageously, the number N1 of input blocks $E_1, \ldots, E_{N1}$ is equal to the number N2 of output blocks $S_1, \ldots, S_{N2}$.

Each input block $E_1, \ldots, E_{N1}$ comprises a predetermined number P1 of input ports $W_1, \ldots, W_{P1}$ strictly greater than 1.

Each input block $E_1, \ldots, E_{N1}$ is able to send, on each input port, an input data stream having a predetermined input throughput $Q_1, \ldots, q_{N1}$. The predetermined input throughput can be different for each input port; however, in the considered example, each input block $E_1, \ldots, E_{N1}$ is able to send the same respective input data stream with the same input throughput on each of its input ports $W_1, \ldots, W_{P1}$. The number P1 of input ports for each input block then corresponds to the number of possible duplications of input data streams. The input ports $W_1, \ldots, W_{P1}$ make it possible to provide redundancy in the transmission of the input data to the output blocks $S_1, \ldots, S_{N2}$.

The input blocks $E_1, \ldots, E_{N1}$, are for example measuring sensors, such as sensors of the video or radar or electromagnetic listening type, able to measure data relative to the environment of the carrier, and in particular the electromagnetic environment of the carrier. The measured data are for example so-called raw digital signals from measuring sensors. The digital signals for example comprise data samples measured by sensors of the Radar type or from electromagnetic listening or raw data streams measured by video sensors.

Each output block $S_1, \ldots, S_{N2}$ comprises a number P2 of output ports $Z_1, \ldots, Z_{P1}$ greater than or equal to the predetermined number P2 of input ports $W_1, \ldots, W_{P1}$.

Each output block $S_1, \ldots, S_{N2}$ is able to receive an output data stream having a maximum output throughput $Q_1, \ldots, Q_{N2}$. For each output block $S_1, \ldots, S_{N2}$, the associated maximum output throughput verifies the inequality $Q_i \geq A \times q_M + R$, with i an index representative of the considered output block, with $q_M$ a maximum of the predetermined input throughputs $q_1, \ldots, q_{N1}$, A an integer strictly greater than 1 and R a real number strictly less than $q_M$.

Advantageously, each output port $Z_1, \ldots, Z_{P2}$ is able to receive a data stream having a maximum throughput $Q'_{1, u}, \ldots, Q'_{N2, u}$ verifying the inequality $Q'_{i, u} \geq q_M$, with i an index representative of the considered output block $S_1, \ldots, S_{N2}$ and u an index representative of the considered output port.

Also advantageously, the measuring system 12 is dimensioned and/or the exchanges in the communication network 18 are timed such that at each moment, one always has:

$$\sum_{j=1}^{N_1} q_j < \sum_{i=1}^{N_2} Q_i,$$

preferably $$\sum_{j=1}^{N_1} A \times q_j < \sum_{i=1}^{N_2} Q_i$$

with $$\sum_{j=1}^{N_1} (A+1) \times q_j > \sum_{i=1}^{N_2} Q_i.$$

Also advantageously, the integer A is less than or equal to the predetermined number P1 of input ports $W_1, \ldots, W_{P1}$, preferably equal to the predetermined number P1 of input ports. By uniformly distributing the input throughput of each input block between A input ports, each output port of each output block can advantageously receive the throughput of any import port of any input block.

In the example of FIGS. 2 to 4, the number N1 of input blocks is equal to the number N2 of output blocks and is equal to 4, while the number P1 of input ports is equal to the number P2 of output ports and is equal to 3.

Advantageously, the number N1 of input blocks is greater than or equal to 3, preferably greater than or equal to 4.

The output blocks $S_1, \ldots, S_{N2}$ are for example computing members, also called computers, able to determine the parameters relative to the environment of the carrier, i.e., of the aircraft in the example of FIG. 1, based on data sent by the input blocks $E_1, \ldots, E_{N1}$ to the output blocks $S_1, \ldots, S_{N2}$ via the communication network 18.

The communication network 18 comprises a plurality of switches $C_1, \ldots, C_{N3}$, data links 24 connecting the switches, the input blocks and the output blocks to one another and a command system 26 of the switches.

It should be noted that the command system 26 is not shown in FIGS. 3 and 4 in order to simplify the drawings.

The communication network 18 comprises a total number N3 of switches.

Each switch $C_1, \ldots, C_{N3}$ comprises a first 30 and second 32 input terminal and a first 34 and second 36 output terminal.

Each switch $C_1, \ldots, C_{N3}$ is able to connect the first and second input terminals, respectively, to first and second output terminals or vice versa, based on a respective command signal received by the switch.

In other words, each switch $C_1, \ldots, C_{N3}$ is able to connect the first and second input terminals, respectively, to first and second output terminals, or the first and second input terminals respectively to the first and second output terminals, based on a respective command signal received by the switch.

When an input terminal 30, 32 is connected to an output terminal 34, 36, the input terminal 30, 32 is able to send the output terminal 34, 36 the input data stream that it receives from one of the input ports $W_1, \ldots, W_{P1}$ to which it is connected by one of the data links 24.

The number N3 of switches depends, in addition to the number N1 of input blocks, on the number P1 of input ports.

When the result of the multiplication of the number of input ports by the number of input blocks is even, as for example shown in FIGS. 2 to 4 where the number of input ports is equal to 3 and the number of input blocks is equal to 4, the number N3 of switches is equal to:

$$N3 = N1 \times \frac{P1}{2}. \tag{1}$$

Thus, in the example of FIGS. 2 to 4, the number of switches is equal to 6.

When the result of the multiplication of the number of input ports by the number of input blocks is odd, the number N3 of switches is equal to:

$$N3 = \frac{N1 \times P1 - 1}{2}. \tag{2}$$

The data links 24 respectively each connect an input terminal 30, 32 to an input port $W_1, \ldots, W_{P1}$ or an output terminal 34, 36 to an output port $Z_1, \ldots, Z_{P2}$ or an input port $W_1, \ldots, W_{P1}$ to an output port $Z_1, \ldots, Z_{P2}$.

In other words, each input port $W_1, \ldots, W_{P1}$ is respectively connected to a single one of the data links 24, each output port $Z_1, \ldots, Z_{P2}$ is respectively connected to a single one of the data links 24 and each input or output terminal is respectively connected to a single one of the data links 24.

The data links 24 are point-to-point physical links.

In the rest of the description, a free input port, free output port, respectively, refers to an input port, respectively output port, that is not yet connected to a data link 24. Conversely, a non-free input port or output port is already connected to a data link 24.

Likewise, a free input terminal, free output terminal, respectively, refers to an input terminal, respectively output terminal, that is not yet connected to a data link 24. Conversely, a non-free input terminal or output terminal is already connected to a data link 24.

The communication network 18 verifies, when the result of the multiplication of the number P1 of input ports by the number N1 of input blocks is odd, that one of the input ports $W_1, \ldots, W_{P1}$ of one of the input blocks $E_1, \ldots, E_{N1}$ is connected directly via a data link 24 to the output port $Z_1, \ldots, Z_{P2}$ of one of the output blocks. In other words, no switch is positioned between said input port and said output port.

The communication network 18 also verifies that for each switch $C_1, \ldots, C_{N3}$, the first 30 and second 32 input terminals are each connected directly via a respective data link 24 to different input blocks $E_1, \ldots, E_{N1}$ and the first 34 and second 36 output terminals are each connected directly via a respective data link to different output blocks $S_1, \ldots, S_{N2}$.

More specifically, the communication network 18 also verifies that for each switch, the first 30 and second 32 input terminals are each connected to one of the input ports of the input blocks and the first 34 and second 36 output terminals are each connected to one of the output ports $Z_1, \ldots, Z_{P2}$ of the output blocks.

The structure of the communication network 18 and in particular the implementation of the data links 24 between the switches $C_1, \ldots, C_{N3}$, the input blocks $E_1, \ldots, E_{N1}$ and the output blocks $S_1, \ldots, S_{N2}$ will be explained in more detail below. In the description below, the references of the described elements are provided solely for information, in order to facilitate understanding and to describe a specific, but non-limiting embodiment of the invention using FIGS. 2 to 4. However, the description applies irrespective of the reference of the switches, input blocks and output blocks.

More specifically, by numbering the input blocks $E_1, \ldots, E_{N1}$ with a different index j going from 1 to N1 and the output blocks with a different index i going from 1 to N2, with N2 the number of output blocks $S_1, \ldots, S_{N2}$, and the switches with a different index m going from 1 to N3, N3 the total number of switches, the communication network 18 respects the following rules in order to connect the input blocks $E_1, \ldots, E_{N1}$, the output blocks $S_1, \ldots, S_{N2}$ and the switches $C_1, \ldots, C_{N3}$ to one another via the data links 24:

a first set of P1 switches $C_1, C_2, C_3$ is selected according to a numbering order of the switches, a second set of P1 output blocks $S_1, S_2, S_3$ is selected according to a numbering order of the output blocks, the input ports $W_1, \ldots, W_{P1}$ of the input block $E_1$ having an index j equal to 1 are respectively connected to one of the input terminals 30 of a respective switch $C_1, C_2, C_3$ of the first set, one of the output terminals 34 of each switch $C_1, C_2, C_3$ of the first set is connected to one of the output ports $Z_1$ of a respective output block $S_1, S_2, S_3$ of the second set, for each input block with index j going from 2 to N1 considered successively:
   a third set of P1 switches having at least one free input terminal 30, 32 is selected, traveling over all of the switches $C_1, \ldots, C_{N3}$ one by one following their numbering order starting from the switch having an index m corresponding to the index j of the input block $E_j$. Circular logic refers to the fact that when one arrives at the switch having index i with value N3, the following switch is the switch having index i with value 1, the input ports of the input block $E_j$ are respectively connected to one of the input terminals of a respective switch of the third set, and if the number of switches of the third set is below the number of input ports P1 of the input block $E_j$, one of the free input ports of the input block $E_j$ is connected to a free output port of one of the output blocks, for each switch $C_1, \ldots, C_{N3}$ in the third set, considered successively in the numbering order of the switches starting from the switch having an index m corresponding to the index j of the input block $E_j$:
      if the switch has a single output block 34, 36 already connected to one of the output blocks $S_1, \ldots, S_{N2}$, the other output terminal of the switch is connected to a following output block, relative to the numbering order of the output blocks. Following means the output block whose index value follows, in the numbering order and with a circular logic, the value of the index of the output block already connected to the switch. Circular logic refers to the fact that when one arrives at the output block having index i with value N2, the following output block is the output block having index i with value 1,
      if the switch is connected to none of the output blocks, one of the output terminals 34, 36 of the switch is connected to one of the output ports $Z_1, \ldots, Z_{P2}$ of the output block $S_1, \ldots, S_{N2}$ that has just been connected to a switch belonging to the third set when said output block $S_1, \ldots, S_{N2}$ that has just been connected to a switch belonging to the third set has at least one free output port, otherwise one of the output terminals 34, 36 of said switch is connected to one of the output ports $Z_1, \ldots, Z_{P2}$ of the following output block $S_1, \ldots, S_{N2}$, relative to the numbering order of the output blocks, that which has just been connected to a switch belonging to the third set.

By respecting the rules set out above and setting the number of input and output ports equal to 3 and the number of input and output blocks equal to 4, one obtains the communication network shown in FIGS. 2 to 4.

The command system 6 is configured to send the respective command signal to each switch $C_1, \ldots, C_{N3}$ so as to command the configuration of the switch, i.e., the manner in which the input terminals are connected to the output terminals within the switch $C_1, \ldots, C_{N3}$.

Advantageously, the command system 26 comprises a device 40 for detecting downtime and/or a failure of the output blocks and/or switches and a command device 42, able to send each command signal to each switch in particular based on downtime/failures detected by the detection device 40.

Also advantageously, the command device 42 comprises a computing unit 44 configured to compute each command signal as a function of the downtime/failures detected by the detection device 40.

Also advantageously, the computing unit 44 is able to receive, for example via a data transmission link 50, data relative to the operation of each input block $E_1, \ldots, E_{N1}$, in particular relative to the number of input ports of each input block sending data over the communication network 18. The computing unit 44 is advantageously configured to compute each command signal also as a function of data relative to the operation of each input block $E_1, \ldots, E_{N1}$.

Alternatively, the computing unit 44 is configured to store the number of input blocks and the number of input ports.

The detection device 40 is for example able to receive, from each switch, a first message relative to an operating state of the switch $C_1, \ldots, C_{N3}$ and preferably also from each output block $S_1, \ldots, S_{N2}$ a second message relative to an operating state of the output block.

The detection device is for example connected to each switch via a data exchange link 52 and each output block via a communication link 54.

FIGS. 2 to 4 illustrate the configuration differences of the switches, i.e., how the switches are commanded via their respective command signal respectively in case of a first, second and third operating mode of the measuring system 12.

In FIGS. 2 to 4, the data links 24 are shown in solid lines when data are sent over these links and in dotted lines if no data pass over these links.

In the example of FIG. 2, the measuring system 12 is in a first operating mode where all of the elements of the measuring system 12 are available, i.e., in nominal operation, able to exchange data.

In the example of FIG. 2, each input block $E_1, \ldots, E_{N1}$ is configured to send an input data stream only on one of its input ports. $W_1, \ldots, W_{P1}$.

In the example of FIG. 3, the measuring system 12 is in the second operating mode where two of the output blocks $S_1$, $S_2$ of the measuring system 12 are down or have failed.

The detection device 40 is then able to detect said downtimes/failures and the computing unit 44 is then able to determine the command signal of each switch to send the input data from each input block to the output blocks during normal operation $S_3$ and $S_{N2}$.

In other words, the command system 26 commands the switches $C_1, \ldots, C_{N3}$ so that the input data streams are sent to the available output blocks $S_3$ et $S_{N2}$.

In the third operating mode of FIG. 4, the input data stream of the input blocks $E_1$, $E_2$, $E_3$ is duplicated once or the quantity of data sent by the input blocks $E_1$, $E_2$, $E_3$ is doubled compared to the first operating mode and the computer $S_1$ is down/has failed.

The command system 26 is then able to modify the command signals of the switches $C_1, \ldots, C_{N3}$ compared to the first operating mode to send the input data from each input block to the output blocks in nominal operation $S_2$, $S_3$ and $S_{N2}$.

Thus, the measuring system 12 is robust with respect to increases in throughput of the input blocks $E_1, \ldots, E_{N1}$ for redundancy reasons or due to the quantity of data to be sent and failures/downtime of output blocks.

In other words, FIGS. 2 to 4 in particular illustrate that by duplicating the signals of each input block A times, it is possible, using the communication network 18, to:
- be robust to X failures/downtimes of switches or output blocks, when X verifies the following inequality:

$$X \leq N1 - \frac{N1}{P1},$$

with $X \leq A$; or
- be robust to an increase in data throughputs at the output of each input block and in particular a multiplication by 2 of data throughputs at the output of each input block; or
- be robust to X' failures/downtimes of switches or output blocks and to an increase in input throughputs of each input block multiplied by 2, with $(N1-X') \times P1 \geq N1 \times 2$.

Figure 5:
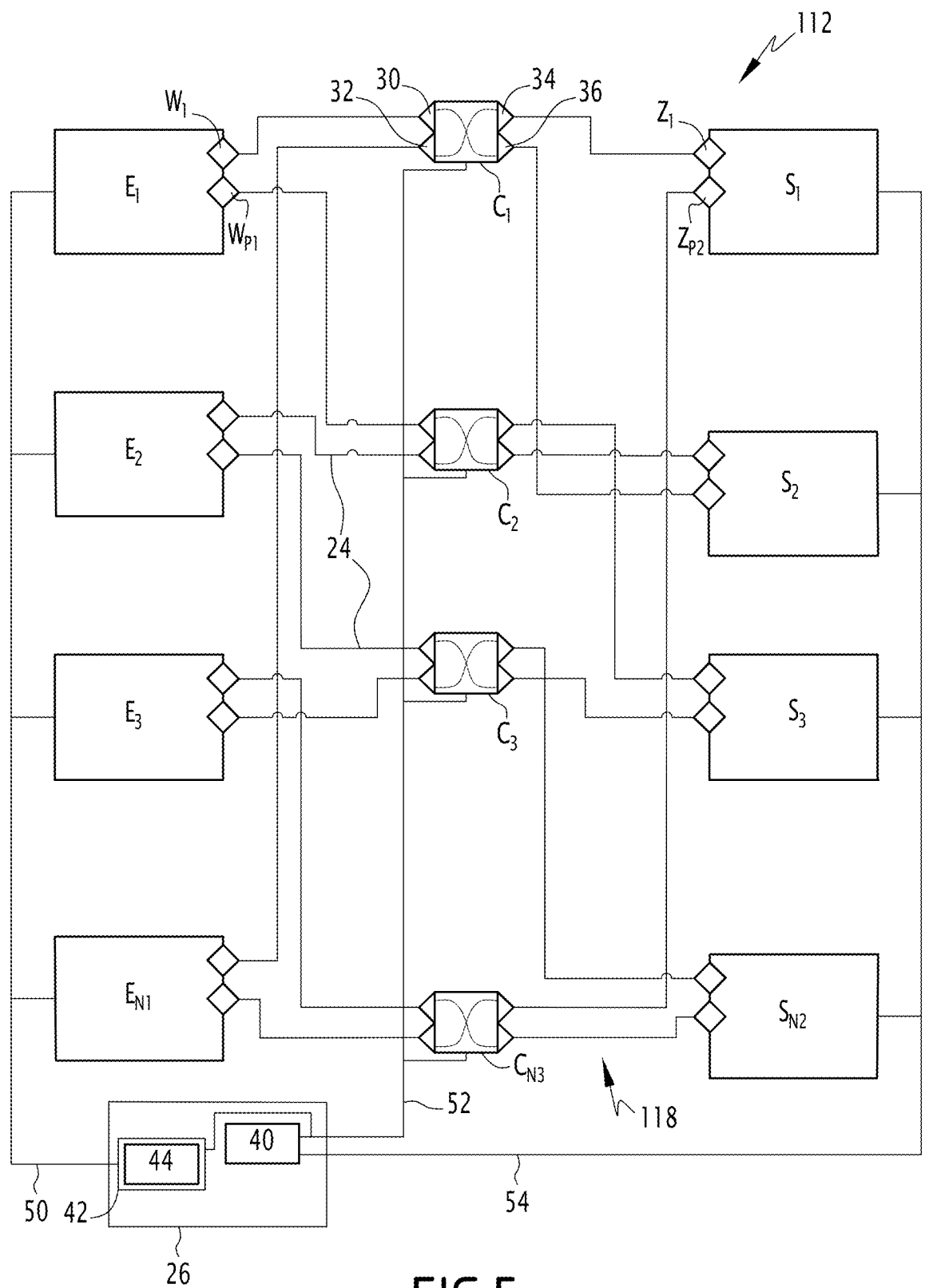
FIG. 5 is a schematic illustration of a measuring system including a second example of a communication network according to the invention.

FIG. 5 shows another example of a measuring system 112 according to the invention.

In the rest of the description and in the drawings, the same references will be used to describe elements shared between the measuring systems 12 and 112, knowing that the measuring systems 12 and 112 differ only by the number of components that they use, i.e., in particular the number of input blocks $E_1, \ldots, E_{N1}$, the number of output blocks $S_1, \ldots, S_{N2}$ and the number of switches $C_1, \ldots, C_{N3}$.

More specifically, in the example of FIG. 5, the number of input blocks N1 is equal to the number of output blocks N2 and is equal to 4, while the number of input ports P1 is equal to the number of output ports P2 and is equal to 2.

In the example embodiment of FIG. 5, the number of switches indeed verifies equation (1) given above and is equal to 4.

FIG. 5 indeed illustrates, in comparison with FIGS. 2 to 4, that the number of switches depends on the number of input blocks and input ports.

The measuring system 112 comprises a communication network 118 obtained following the same rules as those set out above for the communication network 18.

Figure 6:
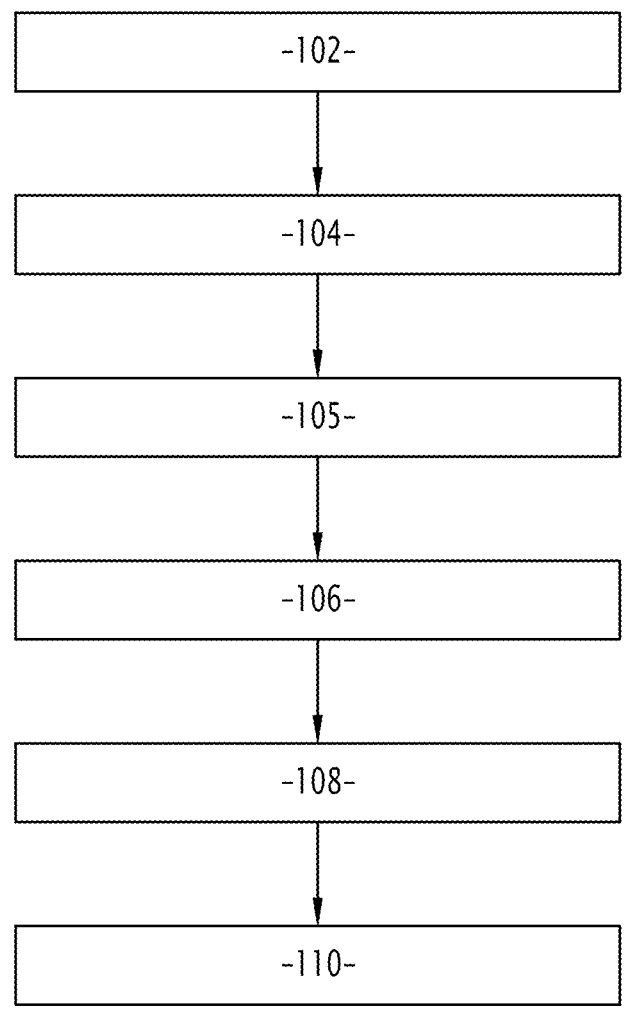
FIG. 6 is a flowchart of a method for building a communication network according to the invention.

The method for building the network of FIGS. 2 to 5 will now be described using the flowchart of FIG. 6.

The method comprises a first step 102 for providing the N1 input blocks and N2 output blocks.

Next, during a second provision step 104, $$N1 \times \frac{P1}{2}$$

switches $C_1, \ldots, C_{N3}$ are provided, if the result of the multiplication of the number of input ports by the number of input blocks is even, while if the result of the multiplication of the number of input ports by the number of input blocks is odd, $$\frac{N1 \times P1 - 1}{2}$$

switches $C_1, \ldots, C_{N3}$ are provided.

Next, during a linking step 105, carried out only if the result of the multiplication of the number of input ports by the number of input blocks is odd, one of the input ports of one of the input blocks is connected directly via a data link to the output port of one of the output blocks.

Then, the method comprises, for each switch $C_1, \ldots, C_{N3}$, a first connecting step 106, during which the first 30 and second 32 input terminals are connected directly via a respective data link to free input ports of different input blocks and a second connecting step 108 during which the first 34 and second 36 output terminals are connected directly via a respective data link to free output ports of different output blocks.

More specifically, by numbering the input blocks $E_1, \ldots, E_{N1}$ with a different index j going from 1 to N1, the output blocks with a different index i going from 1 to N2, and the switches with a different index m going from 1 to N3, the method comprises, during the linking and connection steps, sub-steps corresponding to the connection rules previously set out, in order to connect the input blocks, the output blocks and the switches to one another via the data links 24.

Lastly, during a final step 110, the command system 26 is connected to the switches, and advantageously to the input and output blocks, in order to command the switches.

The communication networks 18, 118 have the same advantages that are related to their architecture and the possibility of commanding the switches. They in particular offer great robustness with respect to failures/downtime of the output blocks or switches and improved possibilities for redundancy and adaptation to an increase in data throughput provided by the input blocks, with minimal complexity in the structure of the network, in particular in terms of number of components making up the network.

The embodiments and alternatives considered above can be combined with one another to create new embodiments of the invention.

The invention claimed is:

1. A communication network extending between a plurality of input blocks and a plurality of output blocks, each input block comprising a predetermined number P1 of input ports and each output block comprising at least the same number P2 of output ports as the predetermined number P1 of input ports, the predetermined number P1 of input ports being strictly greater than 1, the network comprising a plurality of switches, each switch comprising a first and second input terminals and a first and second output terminals and being able to connect the first and second input terminals, respectively, to the first and second output terminals or vice versa, based on a command signal received by the switch, wherein:

when the result of the multiplication of the number of input ports P1 by the number of input blocks N1 is even, the number N3 of switches is equal to:

$$N3 = N1 \times \frac{P1}{2},$$

with N1 the number of input blocks, and when the result of the multiplication of the number of input ports P1 by the number of input blocks N1 is odd, the number N3 of switches is equal to:

$$N3 = \frac{N1 \times P1 - 1}{2},$$

and one of the input ports of one of the input blocks is connected directly via a data link to the output port of one of the output blocks, and wherein for each switch, the first and second input terminals are each connected directly via a respective data link to different input blocks and the first and second output terminals are each connected directly via a respective data link to different output blocks.

2. The communication network according to claim 1, wherein for each switch, the first and second input terminals are connected to the input blocks via one of their input ports and the first and second output terminals are connected to the output blocks via one of their output ports, and wherein each input port is respectively connected to a single one of the data links and each output port is respectively connected to a single one of the data links.

3. The communication network according to claim 1, wherein the data links are point-to-point physical links.

4. The communication network according to claim 1, wherein by numbering the input blocks with a different index j going from 1 to N1 and the output blocks with a different index i going from 1 to N2, with N2 the number of output blocks, and the switches with a different index m going from 1 to N3, the total number of switches, the communication network respects the following rules in order to connect the input blocks, the output blocks and the switches to one another via the data links:

a first set of P1 switches is selected from among the switches according to a numbering order of the switches, a second set of P1 output blocks is selected from among the output blocks according to a numbering order of the output blocks, the input ports of the input block having an index j equal to 1 are respectively connected to one of the input terminals of a respective switch of the first set, one of the output terminals of each switch of the first set is connected to one of the output ports of a respective output block of the second set, for each input block with index j going from 2 to N1 considered successively:

a third set of P1 switches having at least one free input terminal is selected, traveling over all of the switches one by one following their numbering order starting from the switch having an index m corresponding to the index j of the input block, the input ports of the input block are respectively connected to one of the input terminals of a respective switch of the third set, and if the number of switches of the third set is below the number of input ports of the input block, one of the free input ports of the input block is connected to a free output port of one of the output blocks, for each switch in the third set, considered successively in the numbering order of the switches starting from the switch having an index m corresponding to the index j of the input block:

if the switch has a single output block already connected to one of the output blocks, the other output terminal of the switch is connected to a following output block, relative to the numbering order of the output blocks, if the switch is connected to none of the output blocks, one of the output terminals of the switch is connected to one of the output ports of the output block that has just been connected to a switch belonging to the third set when said output block that has just been connected to a switch belonging to the third set has at least one free output port, otherwise one of the output terminals of said switch is connected to one of the output ports of the following output block, relative to the numbering order of the output blocks, that which has just been connected to a switch belonging to the third set.

5. The communication network according to claim 1, wherein the communication network comprises a device for detecting downtime of the output blocks and/or switches and a command device able to send each command signal to each switch, and wherein the command device comprises a computing unit configured to compute each command signal as a function of the detected downtime.

6. A measuring system for a carrier, comprising a plurality of input blocks, a plurality of output blocks, and a communication network extending between the input blocks and the output blocks, each input block comprising a predetermined number P1 of input ports and each output block comprising at least the same number P2 of output ports as the predetermined number P1 of input ports, the predetermined number P1 of input ports being strictly greater than 1, the network comprising a plurality of switches, each switch comprising a first and second input terminals and a first and second output terminals and being able to connect the first and second input terminals, respectively, to the first and second output terminals or vice versa, based on a command signal received by the switch, wherein:

when the result of the multiplication of the number of input ports P1 by the number of input blocks N1 is even, the number N3 of switches is equal to:

$$N3 = N1 \times \frac{P1}{2},$$

with N1 the number of input blocks, and when the result of the multiplication of the number of input ports P1 by the number of input blocks N1 is odd, the number N3 of switches is equal to:

$$N3 = \frac{N1 \times P1 - 1}{2},$$

and one of the input ports of one of the input blocks is connected directly via a data link to the output port of one of the output blocks, and wherein for each switch, the first and second input terminals are each connected directly via a respective data link to different input blocks and the first and second output terminals are each connected directly via a respective data link to different output blocks.

7. The measuring system according to claim 6, wherein each input block is able to send, on each input port, an input data stream having a predetermined input throughput and each output block is able to receive an output data stream having a maximal output throughput, and in that for each output block, the associated maximum output throughput verifies the inequality $Q_i \geq A \times q_M + R$, with i an index representative of the output block in question, with $q_M$ a maximum of the predetermined input throughputs, A an integer strictly greater than 1 and R a real number strictly less than $q_M$.

8. The measuring system according to claim 7, wherein the predetermined number P1 of input ports verifies the following inequality: $P1 \leq A$.

9. A carrier comprising a measuring system, the measuring system comprising a plurality of input blocks, a plurality of output blocks, and a communication network extending between the input blocks and the output blocks, each input block comprising a predetermined number P1 of input ports and each output block comprising at least the same number P2 of output ports as the predetermined number P1 of input ports, the predetermined number P1 of input ports being strictly greater than 1, the network comprising a plurality of switches, each switch comprising a first and second input terminals and a first and second output terminals and being able to connect the first and second input terminals, respectively, to the first and second output terminals or vice versa, based on a command signal received by the switch, wherein:

when the result of the multiplication of the number of input ports P1 by the number of input blocks N1 is even, the number N3 of switches is equal to:

$$N3 = N1 \times \frac{P1}{2},$$

with N1 the number of input blocks, and when the result of the multiplication of the number of input ports P1 by the number of input blocks N1 is odd, the number N3 of switches is equal to:

$$N3 = \frac{N1 \times P1 - 1}{2},$$

and one of the input ports of one of the input blocks is connected directly via a data link to the output port of one of the output blocks, and wherein for each switch, the first and second input terminals are each connected directly via a respective data link to different input blocks and the first and second output terminals are each connected directly via a respective data link to different output blocks.

10. A method for building a communication network extending between a plurality of input blocks and a plurality of output blocks, each input block comprising a predetermined number P1 of input ports and each output block comprising at least the same number P2 of output ports as the predetermined number P1 of input ports, the predetermined number P1 of input ports being strictly greater than 1, the method comprising the following step:

providing a plurality of switches, each switch comprising a first and second input terminals and a first and second output terminals and being able to connect the first and second input terminals, respectively, to first and second output terminals or vice versa, based on a command signal received by the switch, wherein:

if the result of the multiplication of the number of input ports by the number of input blocks is even, the number N3 of switches provided during the provision step is equal to:

$$N3 = N1 \times \frac{P1}{2},$$

with N1 the number of input blocks, and if the result of the multiplication of the number of input ports by the number of input blocks is odd, the number N3 of switches provided during the provision step is equal to:

$$N3 = \frac{N1 \times P1 - 1}{2},$$

wherein the result of the multiplication of the number P1 of input ports by the number N1 of input blocks is odd, the method comprises a linking step during which one of the input ports of one of the input blocks is connected directly via a data link to the output port of one of the output blocks, wherein the method comprises, for each switch, the following steps:
   the direct connection of the first and second input terminals via a respective data link to different input blocks, and
   the direct connection of the first and second output terminals via a respective data link to different output blocks.

11. The method according to claim 10, wherein by numbering the input blocks with a different index j going from 1 to N1 and the output blocks with a different index i going from 1 to N2, with N2 the number of output blocks, and the switches with a different index m going from 1 to N3, the total number of switches, the method comprises, during the linking and connection steps, the following sub-steps, in order to connect the input blocks, the output blocks and the switches to one another via the data links:
   a first set of P1 switches is selected from among the switches according to a numbering order of the switches,
   a second set of P1 output blocks is selected from among the output blocks according to a numbering order of the output blocks,
   the input ports of the input block having an index j equal to 1 are respectively connected to one of the input terminals of a respective switch of the first set,
   one of the output terminals of each switch of the first set is connected to one of the output ports of a respective output block of the second set,
   for each input block with index j going from 2 to N1 considered successively:
      a third set of P1 switches having at least one free input terminal is selected, traveling over all of the switches one by one following their numbering order starting from the switch having an index m corresponding to the index j of the input block,
      the input ports of the input block are respectively connected to one of the input terminals of a respective switch of the third set, and if the number of switches of the third set is below the number of input ports of the input block, one of the free input ports of the input block is connected to a free output port of one of the output blocks,
   for each switch in the third set, considered successively in the numbering order of the switches starting from the switch having an index m corresponding to the index j of the input block:
      if the switch has a single output block already connected to one of the output blocks, the other output terminal of the switch is connected to a following output block, relative to the numbering order of the output blocks,
      if the switch is connected to none of the output blocks, one of the output terminals of the switch is connected to one of the output ports of the output block that has just been connected to a switch belonging to the third set when said output block that has just been connected to a switch belonging to the third set has at least one free output port, otherwise one of the output terminals of said switch is connected to one of the output ports of the following output block, relative to the numbering order of the output blocks, that which has just been connected to a switch belonging to the third set.

* * * * *